United States Patent
Namuduri et al.

(10) Patent No.: US 10,724,491 B2
(45) Date of Patent: Jul. 28, 2020

(54) BRUSHLESS STARTER SYSTEM WITH PINION PRE-ENGAGEMENT CONTROL

(71) Applicant: GM Global Technology Operations LLC, Detroit, MI (US)

(72) Inventors: Chandra S. Namuduri, Troy, MI (US); Kenneth J. Shoemaker, Highland, MI (US); Chunhao J. Lee, Troy, MI (US); Lei Hao, Troy, MI (US); Thomas W. Nehl, Shelby Township, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 15/967,918

(22) Filed: May 1, 2018

(65) Prior Publication Data
US 2019/0338744 A1    Nov. 7, 2019

(51) Int. Cl.
*F02N 11/00* (2006.01)
*F02N 11/08* (2006.01)

(52) U.S. Cl.
CPC .... *F02N 11/0851* (2013.01); *F02N 2200/047* (2013.01)

(58) Field of Classification Search
CPC .............. F02N 11/0851; F02N 2200/047
See application file for complete search history.

(56) References Cited

U.S. PATENT DOCUMENTS

| 7,996,135 B2 * | 8/2011 | Ishii | F02N 11/0855 |
| | | | 123/179.3 |
| 8,733,190 B2 * | 5/2014 | Palfai | F02N 11/0844 |
| | | | 123/179.3 |

(Continued)

FOREIGN PATENT DOCUMENTS

| CN | 2711983 Y | 7/2005 |
| DE | 19914904 A1 | 10/2000 |

(Continued)

OTHER PUBLICATIONS

Quanbao Zhou, John Houldcroft, "Cold engine cranking torque requirement analysis," SAE International Inc., 2007, JSAE 20077002.

(Continued)

*Primary Examiner* — Phutthiwat Wongwian
*Assistant Examiner* — Sherman D Manley
(74) *Attorney, Agent, or Firm* — Quinn IP Law (57) ABSTRACT

An electric starter system is used with an engine. The starter system may include a solenoid device coupled to a pinion gear, a brushless starter motor connectable to the engine via the pinion gear during a requested engine start event, and a controller. In response to the start event, when the engine speed is less than a threshold speed, the controller delivers a control current to the solenoid device at a peak current level sufficient for translating the pinion gear into contact with the flywheel. The control current is reduced to a holding current level less than the peak current level after the pinion gear is engaged with the flywheel. Motor torque is commanded from the starter motor, through the pinion gear, and (Continued)

to the flywheel while maintaining the holding current level, and held for a duration sufficient for starting the engine.

12 Claims, 3 Drawing Sheets

(56) References Cited

U.S. PATENT DOCUMENTS

| | | | | |
|---|---|---|---|---|
| 10,190,561 | B1* | 1/2019 | Hao | F02N 11/0851 |
| 10,436,167 | B1* | 10/2019 | Namuduri | F02N 11/0818 |
| 2002/0014216 | A1* | 2/2002 | Boegner | F02N 11/02 |
| | | | | 123/179.3 |
| 2002/0017260 | A1* | 2/2002 | Saito | F02N 11/0851 |
| | | | | 123/179.3 |
| 2002/0053961 | A1* | 5/2002 | Kajino | F02N 11/087 |
| | | | | 335/126 |
| 2006/0181084 | A1* | 8/2006 | Albertson | F02N 11/0855 |
| | | | | 290/38 R |
| 2010/0033066 | A1* | 2/2010 | Murata | H02K 7/14 |
| | | | | 310/68 R |
| 2010/0256896 | A1* | 10/2010 | Kitano | F02N 11/0855 |
| | | | | 701/113 |
| 2010/0257975 | A1* | 10/2010 | Niimi | F02N 15/067 |
| | | | | 74/7 C |
| 2011/0239821 | A1* | 10/2011 | Ogawa | F02N 11/0851 |
| | | | | 74/7 R |
| 2013/0133604 | A1* | 5/2013 | Gray | F02N 11/0851 |
| | | | | 123/179.3 |
| 2013/0133605 | A1* | 5/2013 | Neet | F02N 11/08 |
| | | | | 123/179.3 |
| 2013/0135065 | A1* | 5/2013 | Neet | H01H 3/28 |
| | | | | 335/72 |
| 2013/0283938 | A1 | 10/2013 | Palfai et al. | |
| 2018/0230957 | A1* | 8/2018 | Kamei | F02D 29/02 |
| 2018/0258900 | A1* | 9/2018 | Namuduri | F02N 11/0848 |
| 2019/0032621 | A1* | 1/2019 | Takeuchi | F02N 11/0829 |
| 2019/0219017 | A1* | 7/2019 | Ono | H01H 51/065 |

FOREIGN PATENT DOCUMENTS

| | | |
|---|---|---|
| DE | 102010003485 A1 | 10/2011 |
| EP | 0619427 B1 | 10/1994 |
| JP | 2000104650 A | 4/2000 |

OTHER PUBLICATIONS

Hao et al, Utility U.S. Appl. No. 15/961,128, filed Apr. 24, 2018.
Hao et al, Utility U.S. Appl. No. 15/961,094, filed Apr. 23, 2018.
Namuduri et al, Utility U.S. Appl. No. 15/967,915, filed May 1, 2018.
Hao et al, Utility U.S. Appl. No. 15/967,910, filed May 1, 2018.

* cited by examiner

BRUSHLESS STARTER SYSTEM WITH PINION PRE-ENGAGEMENT CONTROL

INTRODUCTION

An internal combustion engine generates engine torque in response to an acceleration request. When the engine is used as part of a powertrain, the generated engine torque is transmitted to a coupled load via a transmission, e.g., a planetary gear arrangement or a gearbox. In some powertrain configurations, a rotor of an electric machine is selectively coupled to a flywheel of the engine, e.g., via a ring gear. Motor torque from the electric machine is used to accelerate the engine to a threshold speed. Torque assist from the electric machine may be used to support the engine's cranking and starting function during an engine auto-start event, with the electric machine in such an application typically referred to as a starter motor.

SUMMARY

An electric starter system is disclosed herein for use with an internal combustion engine. The electric starter system includes a pinion gear, a solenoid device, and a brushless starter motor. The starter motor is selectively connectable to, i.e., meshed with, a flywheel of the engine via the pinion gear in response to a requested engine start event, with the pinion gear translated into meshed engagement with the flywheel of the engine and a planetary gear system of the brushless starter motor by controlled operation of the solenoid device.

A controller is used as part of the above-noted electric starter system. The controller is configured to expedite the engine start event using the solenoid device in conjunction with the brushless starter motor, with the controller possibly regulating operation of the solenoid device and the starter motor over separate control lines or transfer conductors as set forth herein. The controller is programmed with logic embodying a control method that the controller automatically executes when the engine is in an auto-stop mode and engine speed is below a threshold speed. As part of the control method, the pinion gear is placed in a pre-engaged state in which the pinion gear is meshed with the flywheel prior to enabling the starter motor. The pinion gear is then held in an engaged state with the flywheel of the engine and a ring gear of the starter motor until the engine has started.

The solenoid device described herein may be powered via pulse-width modulation (PWM) signals, e.g., directly over a dedicated control line or enabled via a controller area network (CAN) bus in a representative vehicle embodiment in which the controller is an engine control module (ECM). The solenoid device is controlled in such a manner as to initially make contact between the pinion gear and the flywheel of the engine, and to thereafter maintain the pinion gear in an engaged position with the engine and starter motor with low power consumption until restart of the engine is complete.

According to an example embodiment, the electric starter system includes the solenoid device coupled to the pinion gear, the brushless starter motor, and the controller. The starter motor is selectively connectable to the engine via the pinion gear during a requested engine start event. The controller, which is in communication with the solenoid device and the starter motor, is configured to execute the control method in response to the requested engine start event. That is, when engine speed is less than a threshold speed, the controller commands/delivers a control current to the solenoid device at a peak current level sufficient for moving the pinion gear into contact with the flywheel. The controller also rotates the motor to mesh the pinion gear with a planetary gear system of the motor before delivering the control current at a holding current level that is less than the peak current level, after the pinion gear is engaged with the flywheel. Thereafter, the controller commands delivery of motor torque from the starter motor, through the pinion gear, and to the flywheel of the engine while maintaining the control current at the lower holding current level, doing so for a duration sufficient for starting the engine.

The controller, after delivering the control current to the solenoid device at the peak current level, may execute/wait through a calibrated duration of delay sufficient for ensuring movement of the pinion gear into contact with the flywheel.

The controller may be configured for delivering the control current at the holding current level using PWM control signals that serve to reduce the peak current level, e.g., by at least 50 percent in some embodiments. For instance, the solenoid device and the brushless starter motor may be optionally powered via an auxiliary voltage bus having a nominal voltage level of 15V or less, with the peak current possibly being about 20 A and the holding current being about 3-4 A in this embodiment.

The controller may be connected to the solenoid device and the brushless starter motor over separate low-voltage control lines each having a voltage level of 15V or less.

A powertrain is also disclosed herein that includes an internal combustion engine having an engine speed, a transmission connected to the engine, a load coupled to the transmission, and the above-noted electric starter system for use with the engine.

Additionally, a method for controlling the electric starter system includes, in response to a requested start of the engine, determining via a controller when the engine speed is less than a threshold speed. The method also includes, responsive to such a determination, delivering a control current to a solenoid device coupled to a pinion gear at a peak current level sufficient for translating the pinion gear into contact and subsequent meshed engagement with the flywheel, and then delivering the control current at a holding current level that is less than the peak current level after the pinion gear is engaged with the flywheel. The method also includes commanding a delivery of motor torque from a brushless starter motor, through the pinion gear, and to the flywheel while delivering the control current at the holding current level, and thereafter maintaining the delivery of motor torque for a duration of delay sufficient for starting the engine.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features may be exaggerated or minimized to show details of particular components. Therefore, specific structural and functional details disclosed herein are not to be interpreted as limiting, but rather as a representative basis for teaching one skilled in the art to variously employ the present disclosure. As those of ordinary skill in the art will also understand, features illustrated and described with reference to a given one of the figures may be combinable with features illustrated in one or more other figures in order to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Figure 1:
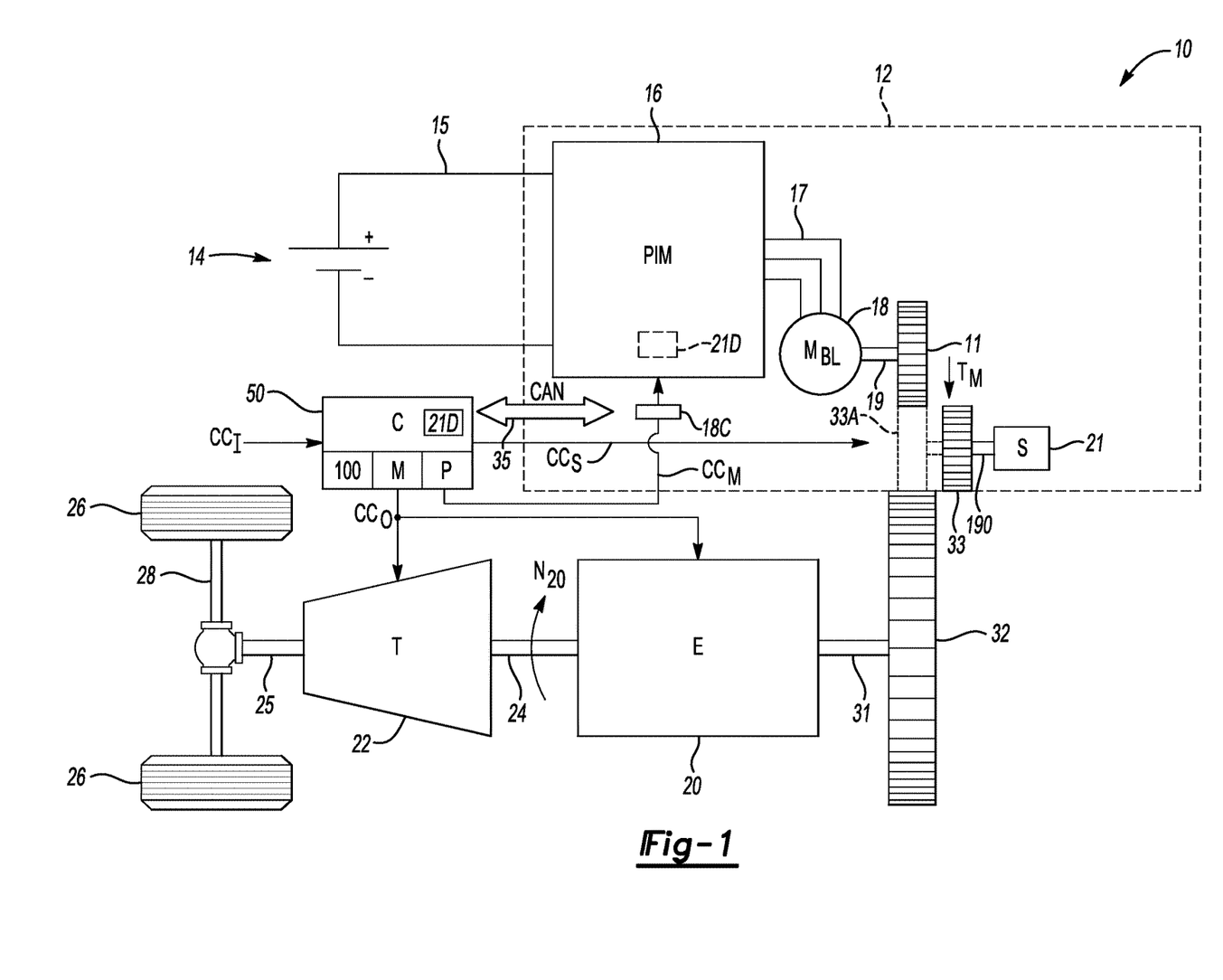
FIG. 1 is a schematic illustration of an example electric starter system for an engine, with the electric starter system including a polyphase/alternating current (AC) brushless starter motor, a pinion gear, and a solenoid device that are collectively controlled during an engine start event via a method as described herein.

Referring to the drawings, wherein like reference numbers refer to the same or like components in the several Figures, an example powertrain 10 is shown schematically in FIG. 1 having an engine (E) 20 coupled via a crankshaft 31 to a flywheel 32, e.g., to a ring gear or other drive mechanism connected thereto. The powertrain 10 also includes an electric starter system 12 operable for automatically cranking and starting the engine 20 during an engine auto-start event, for instance after the engine 20 has been turned off at idle.

The electric starter system 12 as disclosed herein includes a poly-phase/alternating current (AC) brushless electric machine, hereinafter referred to as starter motor ($M_{BL}$) 18. As such, the starter motor 18 employs an electronic commutator using solid-state switches to provide cranking torque in support of a start-stop function of the engine 20. The starter motor 18 includes a rotor 19 coupled to a planetary gear system 11, e.g., a ring gear and/or one or more gear elements. The electric starter system 12 also includes a solenoid device (S) 21 coupled to a pinion gear 33 via a shaft 190, with the pinion gear 33 able to be selectively engaged with the flywheel 32 via operation of the solenoid device 21.

As explained in further detail below with reference to FIGS. 2 and 3, a controller 50, such as an engine control module in an exemplary vehicle embodiment, is configured to execute a method 100 in the overall control of a torque operation of the starter motor 18. This occurs both during and after an auto-start event of the engine 20. Rather than using a permanently-engaged starter motor with a one-way clutch disposed between the crankshaft 31 and flywheel 32, such that one member is continuously rotating with the engine 20, or approaches using "dual-tandem" configurations in which separate solenoids are used to control a pinion gear and energize a brush-type starter motor, the present approach instead employs the solenoid device 21 as a single solenoid within the electric starter system 12. As such, the present approach enables reduced power operation and extended periods of engagement of the pinion gear 33 with the flywheel 32 during auto-stop/start events of the engine 20.

In particular, the controller 50 executes logic embodying the method 100 as part of a pinion pre-engagement scheme when the engine 20 is in an auto-stop mode and engine speed ($N_{20}$) is below a calibrated threshold speed. The controller 50 holds the pinion gear 33 engaged with the flywheel 32, and thus with the engine 20, until a commanded restart operation of the engine 20 using the brushless starter motor 18 is complete. After a predetermined duration, the controller 50 reduces a level of voltage or current that is supplied to the solenoid device 21, such as via pulse width modulation (PWM) or other suitable electronic switching control technique. In this manner, the controller 50 holds the pinion gear 33 in meshed engagement with the flywheel 32, e.g., with a splined or toothed gear member connected thereto, without overheating the solenoid device 21. Motor torque (arrow $T_M$) from the starter motor 18 is used to control rotation of the pinion gear 33 in a manner that ensures full seating of the pinion gear 33 on the planetary gear system 11. In this manner, the approach described herein is intended to help eliminate noise, vibration, and harshness due to suboptimal gear meshing during the auto-start event.

Further with respect to the powertrain 10 and electric starter system 12 shown in FIG. 1, the engine 20 may be embodied as a gasoline or diesel engine, and ultimately outputs engine torque to an output shaft 24. The output shaft 24 may be coupled to a transmission (T) 22, e.g., via a hydrodynamic torque converter or clutch (not shown). The transmission 22 ultimately delivers output torque at a particular gear or speed ratio to a transmission output member 25. The output member 25 in turn drives a coupled load via one or more drive axles 28, with the load depicted in FIG. 1 being a set of drive wheels 26 in an example automotive application. Other beneficial applications for the powertrain 10 may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

When the engine 20 is not running, such as after a fuel-conserving auto-stop event of the engine 20 at idle or when cruising with the engine 20 turned off, the electric starter system 12 may be electrically and automatically energized in response to solenoid control signals (arrow $CC_S$) from the controller 50 so as to selectively deliver starting motor torque (arrow $T_M$) to the flywheel 32. One possible configuration for achieving such ends is the use of the solenoid device 21 situated as depicted in FIG. 1. The solenoid device 21 may include the shaft 190, possibly with a lever (not shown) located between the shaft 190 and the solenoid device 21.

When the solenoid device 21 is energized in response to the solenoid control signals (arrow $CC_S$) from the controller 50, the solenoid device 21 linearly translates the pinion gear 33 to the position indicated at 33A, and thus into direct contact and meshed engagement with mating teeth or splines on both the flywheel 32 and the planetary gear system 11. Once the engine 20 has started, the solenoid control signals (arrow $CC_S$) are discontinued. As a result, the solenoid device 21 is de-energized. The pinion gear 33 is then urged out of engagement with the flywheel 32 via a return action of the solenoid device 21. Other configurations may exist for selectively engaging the pinion gear 33 with the flywheel 32 and planetary gear system 11, and therefore the illustrated embodiment is intended to be illustrative of the general concepts disclosed herein without limiting the electric starter system 12 to such an embodiment.

The electric starter system 12 may include or may be connected to a direct current (DC) battery pack 14, e.g., a multi-cell lithium ion, nickel metal hydride, or lead acid battery pack having positive (+) and negative (−) terminals. The battery pack 14 may be an auxiliary battery pack, e.g., having a nominal voltage at auxiliary levels, e.g., about 12-15 VDC. Thus, in a vehicular embodiment of the powertrain 10 the solenoid device 21 may be powered by PWM voltage generated by the controller 50. The controller 50 may be electrically connected to the solenoid device 21 and the brushless starter motor 18 over separate control lines in a possible embodiment, with each control line possibly having a voltage level up to the voltage level of the battery 14.

The electric starter system 12 may include the power inverter module (PIM) 16, which in turn is electrically connected across the positive (+) and negative (−) terminals of the battery pack 14 via a DC voltage bus 15, as well as to a poly-phase/alternating current (AC) voltage bus 17. While shown separately from the starter motor 18 for illustrative clarity, the PIM 16 and starter motor 18 may be an integrated assembly. Although omitted from FIG. 1 for illustrative simplicity, the PIM 16 includes semiconductor switching pairs, typically MOSFETs, which are connected to positive (+) and negative (−) terminals via the DC voltage bus 15, and signal filtering circuit components which ultimately convert DC power from the battery pack 14 into poly-phase power on the AC voltage bus 17.

In turn, the AC voltage bus 17 is electrically connected to individual phase windings internal to the brushless starter motor 18. The starter motor 18 may be configured such that a calibrated back electromotive force (BEMF) results for a given performance range, e.g., 3-5V at 6000 RPM, or other values ensuring that sufficient motor torque (arrow $T_M$) is available for starting the engine 20. The starter motor 18 may be variously configured as a surface permanent magnet machine, an internal permanent magnet machine, a drag-cup induction machine, a switched reluctance machine, or another type of brushless motor without limitation. As recognized herein, brushless motors such as the starter motor 18 may enjoy an extended operating life with an improved level of speed control precision relative to certain brush-type motors, among other possible benefits.

The controller 50 of FIG. 1 is configured to receive measured voltage, current, position, temperature, and/or other suitable electrical value as part of a set of input signals (arrow CO. The controller 50 may be variously implemented as one or more control devices collectively managing the motor torque (arrow $T_M$) from the starter motor 18 as part of the method 100. The controller 50 is configured to control the solenoid device 21 via the solenoid control signals (arrow $CC_S$) and, at the same time, enable and energize the starter motor 18 via motor control signals (arrow $CC_M$), with the solenoid control signals (arrow $CC_S$) and motor control signals (arrow $CC_M$) possibly being transmitted over separate control lines or transfer connectors. That is, the starter system 12 is characterized by a single solenoid, i.e., the solenoid device 21. As a result, the solenoid device 21 may be supplied with a PWM voltage signal to enable soft/low-noise engagement and holding currents that help maintain the pinion gear 33 in a meshed pre-engaged state during an auto-stop condition.

Multiple controllers may be in communication via a serial bus, e.g., the CAN bus 35, other differential voltage networks, or via discrete conductors. The solenoid device 21 may be responsive to a solenoid driver circuit 21D, which may reside in the controller 50 or the PIM 16 in different embodiments. In this manner, the controller 50 may either control the solenoid device 21 directly or may merely enable control of the solenoid device 21, e.g., by the PIM 16 and/or a motor control processor 18C of the starter motor 18.

The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. The controller 50 may also store algorithms and/or computer executable instructions in memory (M), including the underlying algorithms or code embodying the method 100 described below, and transmit commands to the electric starter system 12 to enable performance of certain control actions according to the present disclosure. While PWM functions are depicted as being conducted by the controller 50, it is also possible to integrate PWM control of the solenoid device 21 into the motor control processor 18C of the starter motor 18 for pre-engaging of the pinion gear 33 via communication between the controller 50, e.g., a powertrain control unit, and the motor control processor 18C.

The controller 50 is in communication with the engine 20 and receives, as part of the input signals (arrow CO, signals indicative of a speed and temperature of the engine 20, as well as other possible engine operating conditions or parameters. Such parameters include a starting request of the engine 20, whether operator-initiated or autonomously generated. The controller 50 is also in communication with the starter motor 18, and thus receives signals indicative of current speed, current draw, torque, temperature, and/or other operating parameters. The controller 50 may also communicate with the battery pack 14 and receive signals indicative of a battery state of charge, temperature, and current draw, as well as a voltage across the respective DC and AC voltage buses 15 and 17. In addition to transmitting a torque request to the starter motor 18 via the solenoid control signals (arrow $CC_S$), the controller 50 may also transmit output signals (arrow $CC_O$) to the engine 20 and transmission 22 as part of the overall operating function of the controller 50.

Figure 2:
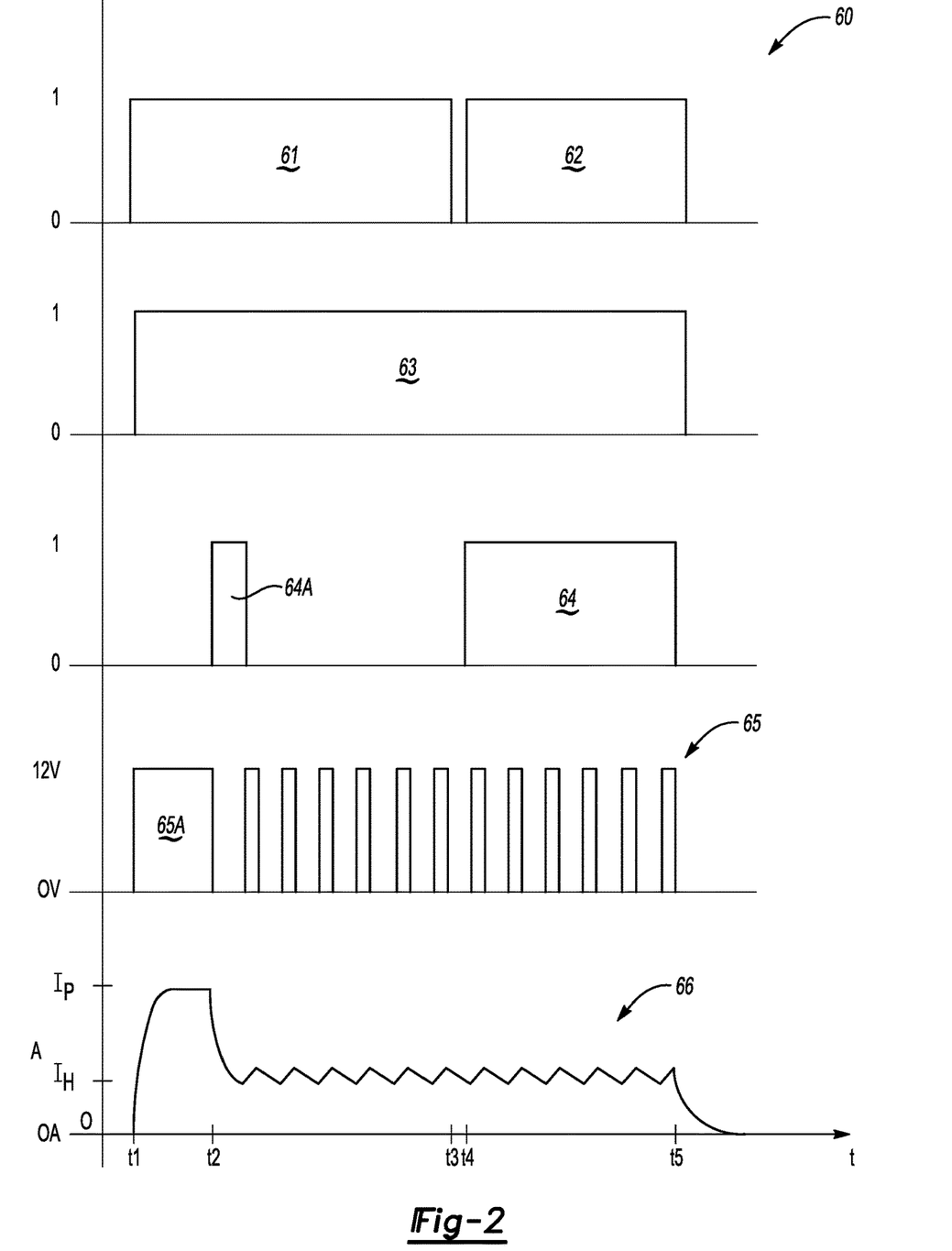
FIG. 2 is a time plot of various bit flags and nominal control values usable in the overall control of the electric starter system shown in FIG. 1.

Referring to traces 60 of FIG. 2, as part of the method 100 the controller 50 is configured to set an engine start flag, e.g., a binary 1 or 0 bit flag, to enable the starter motor 18 and the solenoid device 21 to be controlled in a subsequent engine start event after an auto-stop condition. Control parameters evaluated as part of the method 100 may include bit flags 61 and 62. Bit flag 61 of FIG. 2 corresponds to an active auto-stop condition in which the engine 20 of FIG. 1 is in an off state, i.e., is not running, and engine speed ($N_{20}$) is less than a threshold speed. This condition extends from about t1 to t3 in FIG. 2. Bit flag 62 is then sent high, e.g., to binary 1 as shown, when the controller 50 commands restart of the engine 20, which commences at t4 and continues until t5.

At t1, the controller 50 sets another bit flag 63 indicating that pre-engagement of the pinion gear 33 is enabled in logic of the controller 50. This pinion-enabled state continues until completion of the restart event at t5. At t2, which is reached shortly after enabling the solenoid device 21, the controller 50 also enables energizing of the starter motor 18, as indicated by bit flag 64. Thus, bit flags 61, 62, 63, and 64 correspond to TRUE/FALSE logic states in which a high value (e.g., 1) is TRUE and a low value (0) is FALSE.

Also shown in FIG. 2 are PWM voltages 65A and 65 which vary between 0V and 12V in a nominal 12V auxiliary embodiment of the DC voltage bus 15 shown in FIG. 1. Thus, between t1 and t2 at an initial pre-engagement of the solenoid device 21 prior to enabling the starter motor 18, the full bus voltage is delivered to the solenoid device 21, as indicated by the initial PWM voltage 65A. PWM voltage 65A is sufficient to cause the pinion gear 33 to overcome friction and begin to move. Between t2 and t5, the controller 50 of FIG. 1 controls the solenoid device 21 at a lower voltage level, and thus with reduced power, as indicated by the significantly shorter duration or duty cycle of each pulse of the PWM voltage 65 relative to the initial PWM voltage 65A.

Responsive to the PWM voltages 65A and 65 is an actual coil current 66 describing the current, in amps, that is delivered to the solenoid device 21. Coil current 66 initially ramps up to a peak current ($I_P$) at t2 before settling to a lower holding current ($I_H$) shortly after t2. Sustaining the holding current ($I_H$) from t2 until t5 ultimately reduces power consumption, with PWM voltage 65 thereafter used to hold the pinion gear 33 of FIG. 1 in an engaged state without overheating the solenoid device 21.

As noted above with reference to FIG. 1, the solenoid device 21 may be supplied by the controller 50 or the motor control processor 18C with a PWM voltage at a level that enables soft engagement of the pinion gear 33 with the flywheel 32 during an auto-stop condition of the engine 20. The on-duration and movement of the starter motor 18 during the auto-stop phase may be controlled in response to setting of the bit flag 64A to complete full seating of the pinion gear 33 on the planetary gear system 11 of FIG. 1. During restart of the engine 20, the starter motor 18 is controlled to deliver maximum power for restart with minimal delay, as the pinion gear 33 is already in a fully seated position with respect to the planetary gear system 11. Once the engine 20 has fully restarted, the controller 50 terminates the engine start signal at about t5 of FIG. 2, as shown via bit flag 62, with the solenoid device 21 de-energized at the same time. The controller 50 also terminates the motor control signal (arrow $CC_M$) when motor speed reaches a predetermined value or when the engine start signal is terminated, whichever comes first. The starter motor 18 is then shut down. The solenoid coil current (trace 66) thereafter decays to zero.

Figure 3:
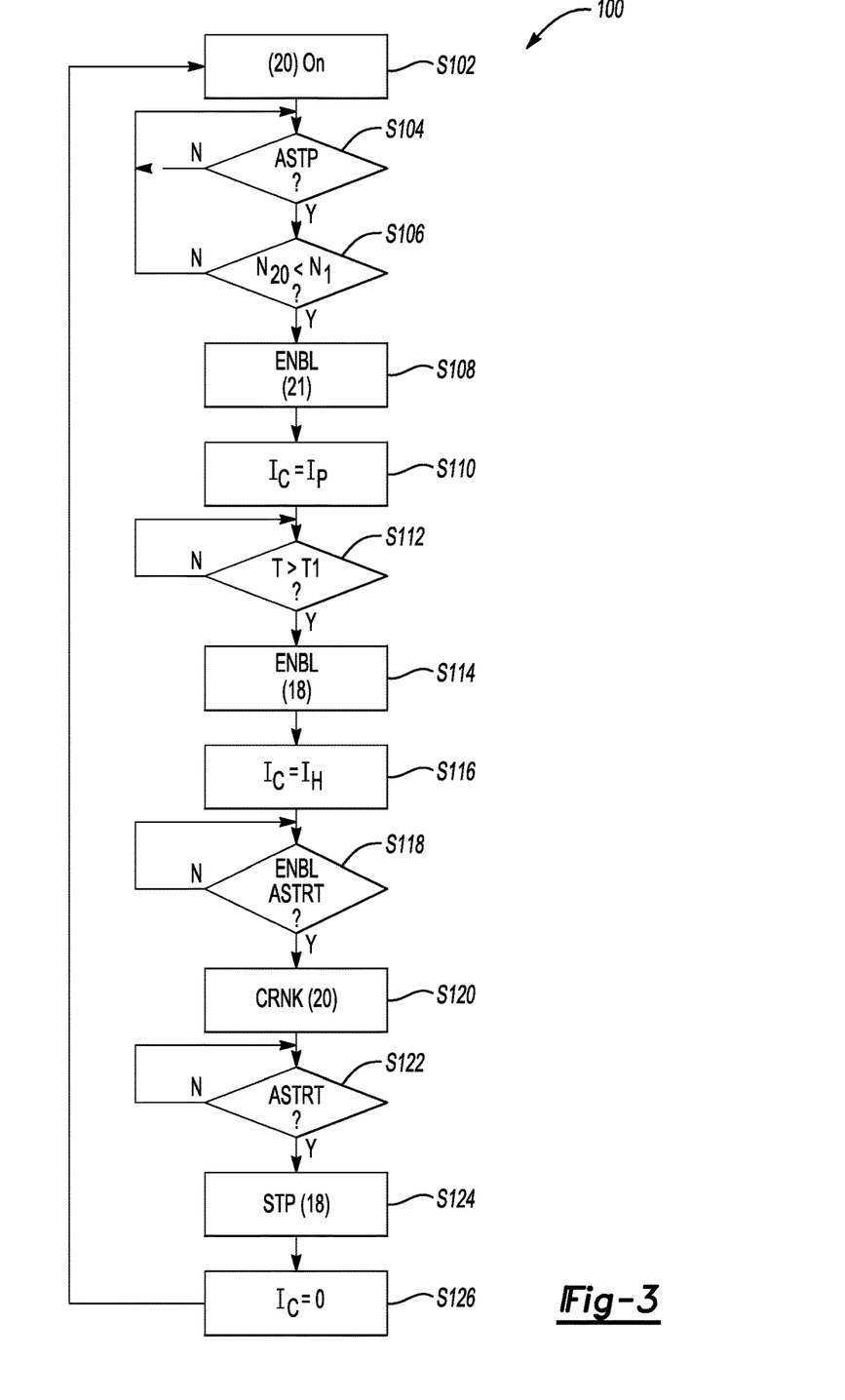
FIG. 3 is a flow chart describing an example embodiment of a method for controlling pre-engagement of the pinion gear and engine in FIG. 1 during a representative engine start event.

Referring to FIG. 3, the method 100 according to an example embodiment commences at step S102 with the engine 20 of FIG. 1 in an on/running state. The method 100 proceeds to step S104 with the engine 20 running.

Step S104 includes determining whether auto-stop (ASTP) of the engine 20 has been enabled. For instance, the controller 50 may determine, via its internal logic, whether operating conditions call for stopping the engine 20, e.g., when a vehicle having the powertrain 10 of FIG. 1 is at a stop light or otherwise idling. Step S104 is repeated until a determination by the controller 50 is made that auto-stop is enabled, at which point the controller 50 proceeds to step S106.

Step S106 includes comparing engine speed ($N_{20}$) to a calibrated threshold speed ($N_1$). The method 100 proceeds to step S108 when engine speed is less than the calibrated threshold speed, i.e., $N_{20} < N_1$. Otherwise, the controller 50 repeats step S104.

At step S108, with engine speed below the calibrated threshold speed at step S106, the controller 50 enables the solenoid device 21, as indicated by bit flag 63 of FIG. 2. The method 100 then proceeds to step S110.

At step S110, the controller 50 commands the solenoid current, $I_C$, for the solenoid device 21 to the peak current level $I_P$, i.e., $I_C = I_P$, as shown via trace 66 of FIG. 2. Such a current may be attained responsive to the solenoid control signals (arrow $CC_S$) of FIG. 1. The method 100 then proceeds to step S112.

Step S112 includes initiating a counter (T) of the controller 50 and waiting for a calibrated duration of delay (T1), with T1 being a predetermined duration suitable for allowing the pinion gear 33 to overcome friction and start to move, with the ultimate goal of achieving contact between the pinion gear 33 and the flywheel 32, i.e., achievement of the pre-engaged state. The method 100 proceeds from step S112 to step S114 when T>T1.

Step S114 may entail enabling the brushless starter motor 18 of FIG. 1 to rotate by a preset angle suitable for fully and smoothly meshing the planetary gear system 11, the pinion gear 33, and the flywheel 32. Steps S108-S114 thus result in translation of the pinion gear 33 to the position indicated at 33A of FIG. 1. The method 100 then proceeds to step S116.

At step S116, the controller 50 next sets the control current, $I_C$, for the solenoid device 21 to a lower holding current level $I_H$, i.e., $I_C = I_H$, as shown at t2 of trace 66 in FIG. 2. The holding current ($I_H$) may be substantially less than the peak current ($I_P$) in certain applications. For instance, the peak current ($I_P$) may be as high as about 15-20 A in an example auxiliary voltage embodiment, while the required holding current ($I_H$) in such an embodiment being as low as about 3-4 A, or about 20 percent of the peak current ($I_P$), with the term "about" as used in describing this particular embodiment meaning to within ±10 percent. Such reduction in current ensures low power dissipation in internal coils of the solenoid device 21 whenever the pinion gear 33 is fully engaged with the flywheel 32. The method 100 then proceeds to step S118.

Step S118 includes determining whether auto start of the engine 20 has been enabled ("ENBL ASTRT"). The method 100 proceeds to step S120 when auto start is enabled, repeating step S118 until enablement has been determined.

Step S120 includes commanding the starter motor 18, via the motor control signals (arrow $CC_M$) of FIG. 1, to crank the engine 20 to a threshold starting speed, where the engine can be fueled and fired to sustain running. Step S120 may include commanding the motor torque (arrow $T_M$) of FIG. 1 at a level sufficient for rotating the crankshaft 31. The method 100 then proceeds to step S122.

At step S122, the controller 50 determines if the auto start event (ASTRT) is complete, a state that is achieved when engine speed ($N_{20}$) exceeds a threshold speed, e.g, an idle speed of 600 RPM, for a predetermined duration such as 200 ms indicative of autostart being complete. The method 100 proceeds to step S124 when the engine 20 has successfully started.

Step S124 includes enabling, via the controller 50, the stopping of the starter motor 18, i.e., STP (18). Step S124 also includes disabling the engagement of the pinion gear 33 via the starter control signals (arrow CC$_S$) of FIG. 1. The solenoid device 21, in response to corresponding control signals from the controller 50, translates the pinion gear 33 out of engagement with the planetary gear system 11 and flywheel 32. The method 100 then proceeds to step S126.

Step S126 entails setting the control current, I$_C$, for the solenoid device 21 to zero amps (0 A) as shown shortly after t5 in trace 66 of FIG. 2. The method 100 is complete, starting anew with step S102 for a subsequent auto stop event.

The method 100 may therefore be used advantageously within the context of the example powertrain 10 of FIG. 1 to improve the NVH performance of an engine start/stop system using the example brushless starter motor 18 described herein, particularly in a single-pinion drive solenoid system powered via PWM signals over a low-voltage power network and/or during change-of-mind starts in which an operator terminates an auto-stop sequence of the engine 20 prior to the engine 20 fully stopping. Engagement of the solenoid device 21 and the starter motor 18 may be commanded by the controller 50 over separate control lines, thus obviating the need for two solenoid devices 21. Such benefits and other possible benefits will be apparent to one of ordinary skill in the art in view of the present disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed:

1. An electric starter system for an internal combustion engine having a flywheel, the electric starter system comprising:
    a pinion gear;
    a solenoid device coupled to the pinion gear;
    a brushless starter motor that is selectively connectable to the flywheel of the engine via the pinion gear; and
    a controller in communication with the solenoid device and the starter motor, the controller being configured to:
        in response to an engine auto-stop signal, command the engine to turn off;
        in response to an engine auto-start signal, determine an engine speed of the engine after being turned off;
        command, in response to the engine speed being less than a threshold speed, a control current be delivered to the solenoid device at a peak current level to thereby translate the pinion gear into contact with the flywheel and the motor;
        command rotation of the starter motor to thereby fully engage the pinion gear with the flywheel;
        transmit pulse width modulation (PWM) control signals at varying voltages to deliver the control current to the solenoid device at a fluctuating holding current level after the pinion gear is fully engaged with the flywheel, the holding current level being a non-zero value less than the peak current level; and
        command delivery of motor torque from the brushless starter motor, through the pinion gear, and to the flywheel while maintaining the control current at the holding current level for a duration sufficient for starting the engine.

2. The electric starter system of claim 1, wherein the controller is further configured, after delivering the control current to the solenoid device at the peak current level and before delivering the control current to the solenoid device at the holding current level, to execute a calibrated delay duration that is sufficient for ensuring the full engagement of the pinion gear with the flywheel.

3. The electric starter system of claim 1, wherein the pulse width modulation control signals are configured to fluctuate between a zero voltage and a nominal voltage with a shortened duty cycle relative to an initial PWM voltage to thereby reduce the peak current level by at least 50 percent.

4. The electric starter system of claim 1, wherein the solenoid device and the brushless starter motor are powered via an auxiliary voltage bus having a nominal voltage level of 15V or less.

5. The electric starter system of claim 4, wherein the peak current is about 15-20 amps (A) and the holding current is about 3-4 A.

6. The electric starter system of claim 1, wherein the controller is electrically connected to the solenoid device and to the brushless starter motor over separate control lines each having a voltage level of 15V or less.

7. A method for controlling an electric starter system for an internal combustion engine having a flywheel, the method comprising:
    commanding, responsive to an engine auto-stop signal, the engine to turn off;
    determining, responsive to an engine auto-start signal via a controller, when an engine speed of the engine is less than a threshold speed;
    commanding, responsive to the engine speed being less than the threshold speed, delivery of a control current to a solenoid device via the controller at a peak current level to thereby translate a pinion gear connected to the solenoid device into contact with the flywheel;
    commanding rotation of a brushless starter motor to thereby fully engage the pinion gear with the flywheel;
    transmit pulse width modulation (PWM) control signals at varying voltages to deliver the control current to the solenoid device at a fluctuating holding current level, that is a non-zero value less than the peak current level, after the pinion gear is fully engaged with the flywheel;
    commanding delivery of motor torque from the brushless starter motor, through the pinion gear, and to the flywheel while maintaining the control current at the holding current level; and
    maintaining the motor torque via the controller for a duration sufficient for starting the engine.

8. The method of claim 7, further comprising, after delivering the control current to the solenoid device at the peak current level and before delivering the control current to the solenoid device at the holding current level, executing a calibrated duration of delay that is sufficient for ensuring full meshed engagement of the pinion gear with the flywheel.

9. The method of claim 7, wherein the pulse width modulation control signals fluctuate between a zero voltage and a nominal voltage with a shortened duty cycle relative to an initial PWM voltage to thereby to reduce the peak current level by at least 50 percent.

10. The method of claim 7, further comprising powering the solenoid device and the brushless starter motor via an auxiliary voltage bus having a nominal voltage level of 15V or less.

11. The method of claim 7, wherein the peak current is about 15-20 amps (A) and the holding current is about 3-4 A.

12. The method of claim 7, further comprising powering the solenoid device and the brushless starter motor over separate control lines each having a voltage level of 15V or less.

\* \* \* \* \*